J. B. Mitchell
Hose Coupling

N° 56,324.            Patented July 10, 1866.

Witnesses
William H. Clifford
George L. Clifford

Inventor
John B. Mitchell

UNITED STATES PATENT OFFICE.

JOHN B. MITCHELL, OF PORTLAND, MAINE, ASSIGNOR TO HIMSELF AND C. M. PLUMMER, OF SAME PLACE.

IMPROVEMENT IN HOSE-COUPLINGS.

Specification forming part of Letters Patent No. 56,324, dated July 10, 1866.

*To all whom it may concern:*

Be it known that I, JOHN B. MITCHELL, of Portland, in the county of Cumberland and State of Maine, have invented a new and Improved Hose-Coupling; and I hereby declare the following to be a full, clear, and exact description thereof, which will enable others to make and use my invention, reference being had to the accompanying drawings, forming part of this specification, in which—

Figure 1:
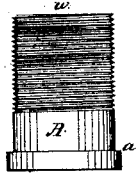
Figure 3:
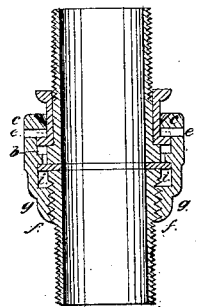
Figure 4:
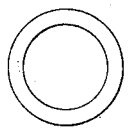
Figure 5:
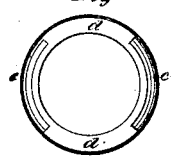
Figure 6:
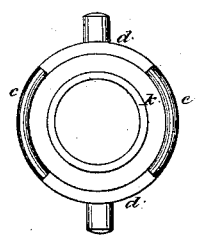
Figure 7:
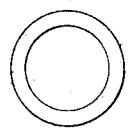
Figure 8:
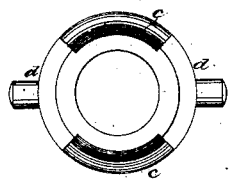
Figure 11:
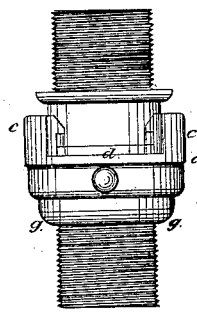
Figure 9:
Figure 10:
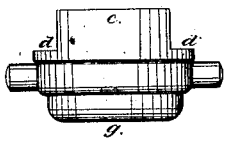

Figure 1 shows a side view of one portion of my invention, having the screw for the purpose of attachment of the hose and a shoulder; Fig. 2, the swivel to fit against the shoulder in Fig. 1. Fig. 3 shows a section of the parts of my invention when placed together; Fig. 4, an end view of the sleeve to encompass the hose when placed over the screw in Fig. 1; Fig. 5, an end view of the union-clutch with the back screw detached; Fig. 6, an end view of the union-clutch or center part of my invention with Fig. 1 inserted; Fig. 7, another sleeve, similar to Fig. 4, to secure the hose at the other end of the coupling; Fig. 8, another view of Fig. 6; Fig. 9, the back screw and screw for attaching the hose; Fig. 10, a side view of Figs. 6 and 8; Fig. 11, a side view of my invention before the sleeves Figs. 4 and 7 have been placed over the hose, which fits on the screws at either end.

Similar letters of reference refer to like parts.

My invention has for its object the production of a more convenient and speedy method of coupling hose than those now employed.

My invention consists of four parts, constructed as hereinafter described: first, the nipple, Fig. 1; second, the swivel, fitting over the end thereof; third, the union-clutch, shown in Fig. 10; fourth, the back screw, seen in Fig. 9.

Upon the nipple Fig. 1 is constructed the shoulder *a*, against which rests the swivel.

Upon the nipple are seen two shoulders, *b*, extending each one-quarter around the circumference. Corresponding to these shoulders are two projections from the center clutch, so constructed as to form a channel, and each extending a quarter around the circumference thereof, with space between them sufficient to admit the shoulders *b* on the swivel. These projections are indicated at *c*, and spaces at *d*.

Upon each of the shoulders *b* is made a recess to receive the steady-pins *e*, which are attached to the inner side of the channels formed by the projections *c*.

In Fig. 9 *f* shows the back screw, which is inserted into the center clutch at *g*. By means of a rim on the inner edge of this screw, it cannot be turned entirely out of the end *g* of the center clutch.

The operation of my invention is as follows: Place the nipple Fig. 1, having the swivel Fig. 2, against the center clutch in such manner that the shoulders *b* shall fit into the spaces *d*. Turn the the back screw out so that the shoulders *b* may rest upon the bottom of the spaces *d*. Then revolve the nipple Fig. 1 one-quarter around, in order that the shoulders *b* may slide into the channels in the projections *c* and the steady-pins *e* may rest in the notches in the shoulders *b*. Then move the back screw, *f*, till the faces of the two nipples Figs. 1 and 9 shall press firmly against each other.

*i* shows a channel in the center clutch, into which is placed a washer to close the joint between the ends of the two nipples Figs. 1 and 9.

The washer is seen at *k*, Fig. 6.

Great inconvenience has been felt in the coupling of hose from the use of a screw, and the consequent difficulty in fitting one screw evenly into the other, so that the threads will match and thus secure a tight joint. This is obviated by my invention, because the coupling is made by simply placing the shoulders *b* in the spaces *d*, and making a quarter-turn to place the shoulders in the channels of the projections *c*, and then turning up the back screw so as to untie the two nipples; and as the back screw is never detached from the center clutch, the threads of the two screws here employed will always remain in their proper relative positions.

The hose is connected with the coupling in the ordinary manner, by means of the parts *u v* of Figs. 1 and 9, and sleeves to fit over the hose when placed thereon.

When the nipple, Fig. 1, is made with the swivel a part thereof, or without the swivel, a slide, with a shoulder to fill the space *d* between the projections *c*, can be substituted for the steady-pins.

What I claim as my invention, and desire to secure by Letters Patent, is—

The combination, in a hose-coupling, of the swivel 2, back screw *f*, nipple 1, having shoulders *a*, the center clutch, 8, with spaces *d* and projections *c*, channels *i* and steady-pins *e*, all substantially as and for the purpose set forth.

JOHN B. MITCHELL.

Witnesses:
WILLIAM H. CLIFFORD,
GEORGE F. CLIFFORD.